(12) United States Patent
Liu

(10) Patent No.: US 11,057,104 B2
(45) Date of Patent: Jul. 6, 2021

(54) INFORMATION TRANSMISSION METHOD AND APPARATUS

(71) Applicant: HUAWEI TECHNOLOGIES CO., LTD., Guangdong (CN)

(72) Inventor: Qi Liu, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 201 days.

(21) Appl. No.: 16/456,135

(22) Filed: Jun. 28, 2019

(65) Prior Publication Data

US 2019/0319700 A1 Oct. 17, 2019

Related U.S. Application Data

(63) Continuation of application No. PCT/CN2017/112884, filed on Nov. 24, 2017.

(30) Foreign Application Priority Data

Dec. 29, 2016 (CN) .......................... 201611249814.4

(51) Int. Cl.
*H04B 7/26* (2006.01)
*H04L 5/00* (2006.01)
(Continued)

(52) U.S. Cl.
CPC ......... *H04B 7/2656* (2013.01); *H04L 5/0037* (2013.01); *H04L 5/14* (2013.01); *H04W 72/0413* (2013.01); *H04W 72/0446* (2013.01)

(58) Field of Classification Search
None
See application file for complete search history.

(56) References Cited

U.S. PATENT DOCUMENTS 9,374,243 B1 * 6/2016 Certain ................ G06Q 40/06
2002/0068577 A1 * 6/2002 Balogh ............ H04W 72/1289
455/452.1
(Continued)

FOREIGN PATENT DOCUMENTS

CN 101287281 A 10/2008
CN 101296508 A 10/2008
(Continued)

OTHER PUBLICATIONS

Office Action issued in Chinese Application No. 201611249814.4 dated Sep. 3, 2019, 12 pages (With English Translation).

(Continued)

*Primary Examiner* — Bunjob Jaroenchonwanit
(74) *Attorney, Agent, or Firm* — Fish & Richardson P.C.

(57) ABSTRACT

Example information transmission methods and apparatus are described. In one example method, a first communications device sends indication information to a second communications device, where the indication information is used to indicate a concurrent subframe in which the first communications device and the second communications device perform information transmission. The first communications device sends first information to the second communications device on a first time-frequency resource in the concurrent subframe. The first communications device receives, on a second time-frequency resource in the concurrent subframe, second information sent by the second communications device.

20 Claims, 12 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2008/0232432 A1* | 9/2008 | Lee | H04L 27/2607 375/140 |
| 2012/0155412 A1* | 6/2012 | Kawamura | H04J 11/003 370/329 |
| 2013/0016712 A1* | 1/2013 | Tomeba | H04L 25/0204 370/345 |
| 2013/0163537 A1* | 6/2013 | Anderson | H04W 72/1284 370/329 |
| 2013/0201938 A1* | 8/2013 | Seol | H04W 72/1284 370/329 |
| 2014/0086116 A1 | 3/2014 | Seo et al. | |
| 2015/0124670 A1* | 5/2015 | Park | H04L 1/1887 370/281 |
| 2015/0181549 A1* | 6/2015 | Batada | G01S 5/14 455/456.1 |
| 2015/0305057 A1* | 10/2015 | Eriksson | H04L 1/1887 370/280 |
| 2016/0269207 A1* | 9/2016 | Gaal | H04L 27/2613 |
| 2016/0353436 A1 | 12/2016 | Au et al. | |
| 2017/0013582 A1* | 1/2017 | Takekawa | H04W 56/0045 |
| 2017/0034819 A1 | 2/2017 | Wang et al. | |
| 2017/0041122 A1* | 2/2017 | Li | H04L 5/001 |
| 2017/0230138 A1* | 8/2017 | Xiong | H04W 72/0473 |
| 2017/0332189 A1* | 11/2017 | Gao | H04W 4/70 |
| 2017/0374660 A1 | 12/2017 | Wang et al. | |
| 2018/0026714 A1 | 1/2018 | Miao et al. | |
| 2018/0278300 A1 | 9/2018 | Cheng et al. | |
| 2018/0302810 A1* | 10/2018 | Fujishiro | H04W 76/28 |
| 2019/0158263 A1* | 5/2019 | Lee | H04L 5/006 |
| 2019/0373669 A1* | 12/2019 | Dai | H04W 74/0833 |
| 2020/0077392 A1* | 3/2020 | Deng | H04L 5/0094 |
| 2020/0235980 A1* | 7/2020 | John Wilson | H04W 56/0045 |
| 2020/0351929 A1* | 11/2020 | Luo | H04W 72/1273 |
| 2021/0037478 A1* | 2/2021 | Yang | H04L 1/1887 |
| 2021/0051705 A1* | 2/2021 | Gao | H04W 72/1284 |

FOREIGN PATENT DOCUMENTS

| | | |
|---|---|---|
| CN | 105191201 A | 12/2015 |
| CN | 106134266 A | 11/2016 |
| CN | 106850164 A | 6/2017 |
| JP | 2018508130 A | 3/2018 |
| WO | 2008127038 A1 | 10/2008 |
| WO | 2015154310 A1 | 10/2015 |
| WO | 2016095690 A1 | 6/2016 |
| WO | 2016154922 A1 | 10/2016 |

OTHER PUBLICATIONS

ZTE et al., "Frame structure design for NR",3GPP TSG RAN WG1 Meeting #85 R1-164274,Nanjing, China, May 23-27, 2016, 11 pages.
ETRI, "Frame structure for new radio interface",3GPP TSG RAN WG1 Meeting #85 R1-164871 ,2016 Nanjing, China, May 23-27, 2016, 3 pages.
Nokia et al., "Basic frame structure principles for 5G",3GPP TSG-RAN WG1#85 R1-165027,Nanjing, P.R. China May 23-27, 2016, 6 pages.
Extended European Search Report issued in European Application No. 17888820.2 dated Oct. 23, 2019, 12 pages.
Office Action issued in Japanese Application No. 2019-534684 dated Sep. 15, 2020, 9 pages (with English translation).
PCT International Search Report and Written Opinion issued in International Application No. PCT/CN2017/112884 dated Feb. 14, 2018, 10 pages (with English translation).
R1-134073—Huawei et al., "Resource assignment for D2D communication," 3GPP TSG RAN WG1 Meeting #74bis, Guangzhou, China, Oct. 7-11, 2013, 5 pages.
Office Action issued in Korean Application No. 2019-7021246 dated Sep. 18, 2020, 11 pages (with English translation).

* cited by examiner

INFORMATION TRANSMISSION METHOD AND APPARATUS

CROSS-REFERENCE TO RELATED APPLICATIONS

This application is a continuation of International Application No. PCT/CN2017/112884, filed on Nov. 24, 2017, which claims priority to Chinese Patent Application No. 201611249814.4, filed on Dec. 29, 2016. The disclosures of the aforementioned applications are hereby incorporated by reference in their entireties.

TECHNICAL FIELD

This application relates to the field of communications technologies, and in particular, to an information transmission method and apparatus.

BACKGROUND

A Long Term Evolution (LTE) system supports two frame structures: a frequency division duplex (FDD) frame structure and a time division duplex (TDD) frame structure. The TDD frame structure is as following: a length of one radio frame is 10 ms, the radio frame includes 10 subframes in total, and a length of each subframe is 1 ms. Further, the 10 subframes include special subframes and normal subframes. The special subframe is divided into three slots: a downlink pilot timeslot (DwPTS), a guard period (GP), and an uplink pilot timeslot (UpPTS). The normal subframes are classified into an uplink subframe and a downlink subframe. The uplink subframe is used to transmit uplink control signaling, uplink service data, and the like. The downlink subframe is used to transmit downlink control signaling, downlink service data, and the like.

The TDD frame structure supports seven different uplink-downlink configurations. Therefore, based on an uplink-downlink configuration, uplink information and downlink information can be transmitted only when a specific time arrives. To be specific, the uplink information can be transmitted only when an uplink subframe arrives, and the downlink information can be transmitted only when a downlink subframe arrives. In such a transmission mode, information waiting duration may be relatively long for a service with a relatively high requirement on a latency.

In conclusion, currently, an information transmission method is urgently required for resolving a prior-art problem of relatively long information waiting duration that may be caused when information is transmitted by using the TDD frame structure.

SUMMARY

Embodiments of the present invention provide an information transmission method, so as to resolve a prior-art problem of relatively long information waiting duration that may be caused when information is transmitted by using a TDD frame structure.

According to a first aspect, an embodiment of the present invention provides an information transmission method. The method is applied to a TDD system, and the method includes:

sending, by a first communications device, indication information to a second communications device based on attribute information of to-be-transmitted target information between the first communications device and the second communications device, where the indication information is used to indicate a concurrent subframe in which the first communications device and the second communications device perform information transmission; and sending, by the first communications device, first information to the second communications device on a first time-frequency resource in the concurrent subframe, and receiving, on a second time-frequency resource in the concurrent subframe, second information sent by the second communications device, where the to-be-transmitted target information is the first information or the second information.

In this way, according to this embodiment of the present invention, uplink and downlink information transmission between different communications devices can be implemented in a concurrent subframe, so that information with a relatively high requirement on a latency can be transmitted in a timely manner in the concurrent subframe, with no need to wait for a specific uplink subframe or downlink subframe. Therefore, a latency can be effectively reduced, and spectrum resource utilization can be improved.

Optionally, the sending, by a first communications device, indication information to a second communications device based on attribute information of to-be-transmitted target information between the first communications device and the second communications device includes:

sending, by the first communications device, the indication information to the second communications device after determining that the attribute information of the first information meets a preset condition and a quantity of available resources between the first communications device and the second communications device is greater than a first threshold; or receiving, by the first communications device, a scheduling request message sent by the second communications device, where the scheduling request message includes the attribute information of the second information; and sending, by the first communications device, the indication information to the second communications device after determining that the attribute information of the second information meets a preset condition and a quantity of available resources between the first communications device and the second communications device is greater than the first threshold.

In this way, the first communications device may send the indication information to the second communications device only after determining that the attribute information of the to-be-transmitted target information meets the preset condition and the quantity of available resources between the first communications device and the second communications device is greater than the first threshold. In other words, if determining that the attribute information does not meet the preset condition or the quantity of available resources is less than or equal to the first threshold, the first communications device may not need to send the indication information to the second communications device to indicate the concurrent subframe, that is, does not need to perform bidirectional information transmission in one subframe.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

According to a second aspect, an embodiment of the present invention provides an information transmission method. The method is applied to a TDD system, and the method includes:

receiving, by a second communications device, indication information that is sent by a first communications device based on to-be-transmitted target information between the first communications device and the second communications device, where the indication information is used to indicate a concurrent subframe in which the first communications device and the second communications device perform information transmission; and receiving, by the second communications device on a first time-frequency resource in the concurrent subframe, first information sent by the first communications device; and sending second information to the first communications device on a second time-frequency resource in the concurrent subframe, where the to-be-transmitted target information is the first information or the second information.

It can be learned from the foregoing that according to this embodiment of the present invention, uplink and downlink information transmission between different communications devices can be implemented in a concurrent subframe, so that information with a relatively high requirement on a latency can be transmitted in a timely manner in the concurrent subframe, with no need to wait for a specific uplink subframe or downlink subframe. Therefore, a latency can be effectively reduced, and spectrum resource utilization can be improved.

Optionally, before the receiving, by a second communications device, indication information sent by a first communications device, the method further includes:

sending, by the second communications device, a scheduling request message to the first communications device, where the scheduling request message includes attribute information of the second information.

According to a third aspect, an embodiment of the present invention provides an information transmission method. The method is applied to a TDD system, and the method includes:

determining, by a first communications device, indication information based on attribute information of to-be-transmitted target information between a second communications device and a third communications device; and sending, by the first communications device, the indication information to the second communications device and the third communications device, where the indication information is used to indicate a concurrent subframe in which the second communications device and the third communications device perform information transmission, where the concurrent subframe is used for sending, by the second communications device, first information to the third communications device on a first time-frequency resource in the concurrent subframe, and for sending, by the third communications device, second information to the second communications device on a second time-frequency resource in the concurrent subframe; and the to-be-transmitted target information is the first information or the second information.

In this way, according to this embodiment of the present invention, bidirectional information transmission between different communications devices can be implemented in a concurrent subframe, so that information with a relatively high requirement on a latency can be transmitted in a timely manner in the concurrent subframe, with no need to wait for a specific subframe. Therefore, a latency can be effectively reduced, and spectrum resource utilization can be improved.

Optionally, the sending, by the first communications device, the indication information to the second communications device and the third communications device based on the attribute information of the to-be-transmitted target information includes:

receiving, by the first communications device, a scheduling request message sent by the second communications device, where the scheduling request message includes the attribute information of the to-be-transmitted target information; and sending, by the first communications device, the indication information to the second communications device and the third communications device after determining that the attribute information of the to-be-transmitted target information meets a preset condition and a quantity of available resources between the second communications device and the third communications device is greater than a first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

According to a fourth aspect, an embodiment of the present invention provides an information transmission method. The method is applied to a TDD system, and the method includes:

receiving, by a second communications device, indication information that is sent by a first communications device based on attribute information of to-be-transmitted target information between the second communications device and a third communications device, where the indication information is used to indicate a concurrent subframe in which the second communications device and the third communications device perform information transmission; and sending, by the second communications device, first information to the third communications device on a first time-frequency resource in the concurrent subframe, and receiving, on a second time-frequency resource in the concurrent subframe, second information sent by the third communications device.

Optionally, before the receiving, by a second communications device, indication information sent by a first communications device, the method further includes:

sending, by the second communications device, a scheduling request message to the first communications device, where the scheduling request message includes the attribute information of the to-be-transmitted target information.

According to a fifth aspect, an embodiment of the present invention provides a communications device. The communications device includes:

a sending module, configured to send indication information to a second communications device based on attribute information of to-be-transmitted target information between the communications device and the second communications device, where the indication information is used to indicate a concurrent subframe in which the communications device and the second communications device perform information transmission, where the sending module is further configured to send first information to the second communications device on a first time-frequency resource in the concurrent subframe; and a receiving module, configured to receive, on a second time-frequency resource in the concurrent subframe, second information sent by the second communications device, where the to-be-transmitted target information is the first information or the second information.

Optionally, the communications device further includes a determining module, and the determining module is configured to determine, before the sending module sends the indication information to the second communications device, that the attribute information of the first information meets a preset condition and a quantity of available resources between the communications device and the second communications device is greater than a first threshold; or the receiving module is further configured to receive a scheduling request message sent by the second communications device, where the scheduling request message includes the attribute information of the second information; and the determining module determines, before the sending module sends the indication information to the second communications device, that the attribute information of the second information meets a preset condition and a quantity of available resources between the communications device and the second communications device is greater than the first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

According to a sixth aspect, an embodiment of the present invention provides a communications device. The communications device includes:

a receiving module, configured to receive indication information that is sent by a first communications device based on to-be-transmitted target information between the first communications device and the communications device, where the indication information is used to indicate a concurrent subframe in which the first communications device and the communications device perform information transmission, where the receiving module is further configured to receive, on a first time-frequency resource in the concurrent subframe, first information sent by the first communications device; and a sending module, configured to send second information to the first communications device on a second time-frequency resource in the concurrent subframe, where the to-be-transmitted target information is the first information or the second information.

Optionally, before the receiving module receives the indication information sent by the first communications device, the sending module is further configured to:

send a scheduling request message to the first communications device, where the scheduling request message includes attribute information of the second information.

According to a seventh aspect, an embodiment of the present invention provides a communications device. The communications device includes:

a determining module, configured to determine indication information based on attribute information of to-be-transmitted target information between a second communications device and a third communications device; and a sending module, configured to send the indication information to the second communications device and the third communications device, where the indication information is used to indicate a concurrent subframe in which the second communications device and the third communications device perform information transmission, where the concurrent subframe is used for sending, by the second communications device, first information to the third communications device on a first time-frequency resource in the concurrent subframe, and for sending, by the third communications device, second information to the second communications device on a second time-frequency resource in the concurrent subframe; and the to-be-transmitted target information is the first information or the second information.

Optionally, the communications device further includes a receiving module, configured to: before the sending module sends the indication information to the second communications device and the third communications device, receive a scheduling request message sent by the second communications device, where the scheduling request message includes the attribute information of the to-be-transmitted target information; and the determining module is specifically configured to determine, before the sending module sends the indication information to the second communications device and the third communications device, that the attribute information of the to-be-transmitted target information meets a preset condition and a quantity of available resources between the second communications device and the third communications device is greater than a first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

According to an eighth aspect, an embodiment of the present invention provides a communications device. The communications device includes:

a receiving module, configured to receive indication information that is sent by a first communications device based on attribute information of to-be-transmitted target information between the communications device and a third communications device, where the indication information is used to indicate a concurrent subframe in which the communications device and the third communications device perform information transmission; and a sending module, configured to send first information to the third communications device on a first time-frequency resource in the concurrent subframe, where the receiving module is further configured to receive, on a second time-frequency resource in the concurrent subframe, second information sent by the third communications device.

Optionally, the sending module is further configured to:

send a scheduling request message to the first communications device, where the scheduling request message includes the attribute information of the to-be-transmitted target information.

In the foregoing embodiments of the present invention, the first communications device sends the indication information to the second communications device based on the attribute information of the to-be-transmitted target information between the first communications device and the second communications device, where the indication information is used to indicate the concurrent subframe in which the first communications device and the second communications device perform information transmission; and the first communications device sends the first information to the second communications device in the concurrent subframe, and receives, in the concurrent subframe, the second information sent by the second communications device, where the to-be-transmitted target information is the first information or the second information. It can be learned from the foregoing that according to the embodiments of the present invention, uplink and downlink information transmission between different communications devices can be implemented in a concurrent subframe, so that information with a relatively high requirement on a latency can be transmitted in a timely manner in the concurrent subframe, with no need to wait for a specific uplink subframe or downlink subframe. Therefore, a latency can be effectively reduced, and spectrum resource utilization can be improved.

DESCRIPTION OF EMBODIMENTS

Figure 1:
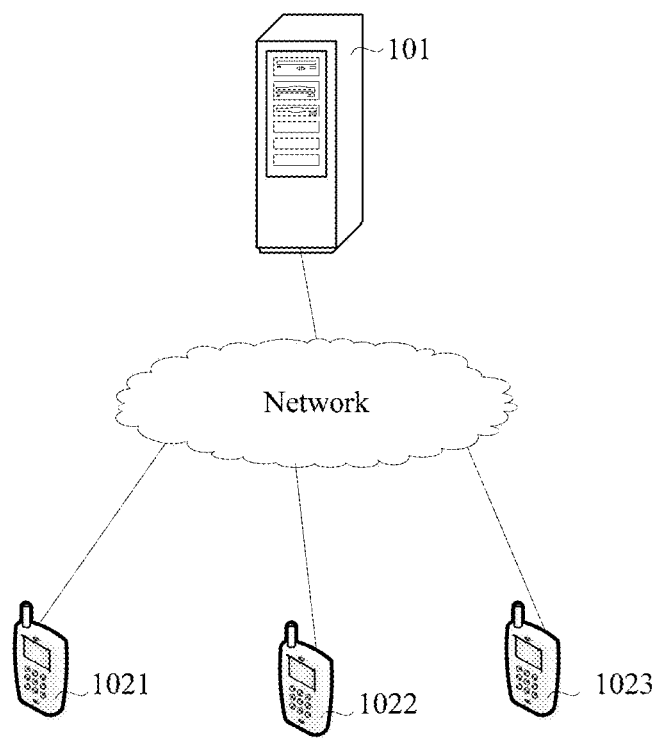
FIG. 1 is a schematic diagram of a first system architecture to which an embodiment of the present invention is applicable.

The following further describes in detail the embodiments of the present invention with reference to the accompanying drawings.

A total of the following seven TDD uplink (UL)/downlink (DL) configurations are defined in an LTE TDD system, as listed in Table 1.

TABLE 1

| | UL/DL configurations | | | | | | | | | |
|---|---|---|---|---|---|---|---|---|---|---|
| Configuration | Subframe number | | | | | | | | | |
| number | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |

TABLE 1-continued

UL/DL configurations

| Configuration number | Subframe number | | | | | | | | | |
|---|---|---|---|---|---|---|---|---|---|---|
| | 0 | 1 | 2 | 3 | 4 | 5 | 6 | 7 | 8 | 9 |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

It can be learned from the content in Table 1 that regardless of which UL/DL configuration is used, only uplink information transmission or downlink information transmission can be performed in a normal subframe other than a special subframe. In other words, when a configuration with a number 0 is used, if a network device needs to send downlink information to a terminal in a subframe 2, because all of the subframe 2, a subframe 3, and a subframe 4 are uplink subframes, the network device needs to wait until a subframe 5 to send the downlink information to the terminal, that is, needs to wait for 3 ms.

Especially, in a future evolved wireless communications system, for example, in a 5G system (which may also be referred to as a New Radio system), a new service type is defined: an ultra-reliable and low latency communications (URLLC) service. The URLLC service requires high reliability and a low latency, and expects that the latency is as low as 1 ms. Therefore, the foregoing TDD information transmission mode cannot meet a latency requirement of the URLLC service because of relatively long information waiting duration.

Based on this, in view of a prior-art problem that information waiting duration is relatively long because only uplink information transmission or downlink information transmission can be performed in a normal subframe, the embodiments of the present invention provide an information transmission method. Specifically, a new subframe type, namely, a concurrent subframe, is defined in a TDD frame structure, and bidirectional information transmission (uplink and downlink information transmission) can be performed in the concurrent subframe. Further, in the embodiments of the present invention, for example, in a configuration manner in which a configuration with a number 0 is used, the concurrent subframe may be any subframe, for example, may be any one or more of a subframe 0, a subframe 1, a subframe 2, a subframe 3, a subframe 4, a subframe 5, a subframe 7, a subframe 8, or a subframe 9.

The information transmission method in the embodiments of the present invention may be applicable to a plurality of system architectures.

FIG. 1 is a schematic diagram of a first system architecture to which an embodiment of the present invention is applicable. As shown in FIG. 1, the system architecture may include a network device 101 and one or more terminals such as a terminal 1021, a terminal 1022, and a terminal 1023 shown in FIG. 1. The network device 101 may perform information transmission with the terminal 1021, the terminal 1022, and the terminal 1023 through a network.

Figure 2:
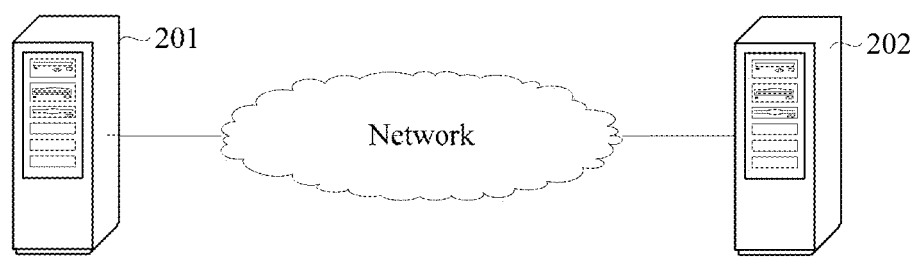
FIG. 2 is a schematic diagram of a second system architecture to which an embodiment of the present invention is applicable.

FIG. 2 is a schematic diagram of a second system architecture to which an embodiment of the present invention is applicable. As shown in FIG. 2, the system architecture may include at least two network devices such as a network device 201 and a network device 202 shown in FIG. 2. The network device 201 and the network device 202 may perform information transmission through a network, for example, may perform information transmission in a wireless self-backhaul manner.

Figure 3:
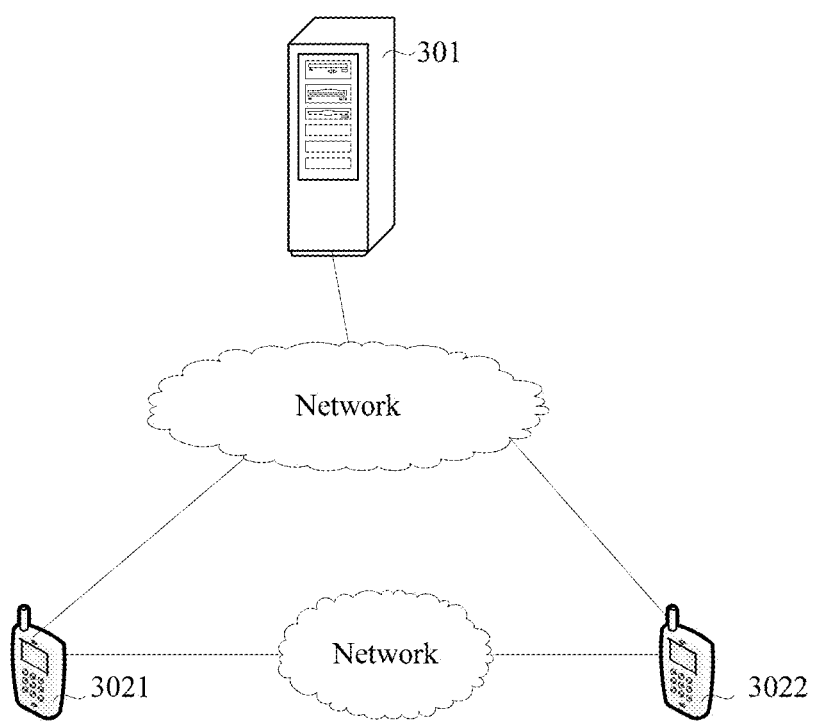
FIG. 3 is a schematic diagram of a third system architecture to which an embodiment of the present invention is applicable.

FIG. 3 is a schematic diagram of a third system architecture to which an embodiment of the present invention is applicable. As shown in FIG. 3, the system architecture may include a network device 301 and one or more terminals such as a terminal 3021 and a terminal 3022 shown in FIG. 3. The network device 301 may control, through a network, the terminal 3021 and the terminal 3022 to perform information transmission.

In the embodiments of the present invention, a network device may be a base station (BS). The base station may also be referred to as a base station, and is an apparatus deployed in a radio access network to provide a wireless communication function. For example, a device providing a base station function in a 2G network includes a base transceiver station (BTS) and a base station controller (BSC); a device providing a base station function in a 3G network includes a NodeB (NodeB) and a radio network controller (RNC); a device providing a base station function in a 4G network includes an evolved NodeB (eNB); a device providing a base station function in a 5G network includes a new radio NodeB (gNB), a centralized unit (CU), a distributed unit (Distributed Unit), and a new radio controller; and a device providing a base station function in a WLAN is an access point (AP).

A terminal may be a device providing voice and/or data connectivity for a user, and includes a wired terminal and a wireless terminal. The wireless terminal may be a handheld device with a wireless connection function or another processing device connected to a wireless modem, and is a mobile terminal that communicates with one or more core networks through a radio access network. For example, the wireless terminal may be a mobile phone, a computer, a tablet computer, a personal digital assistant (PDA), a mobile Internet device (MID), a wearable device, or an e-book reader. For another example, the wireless terminal may alternatively be a portable mobile device, a pocket-sized mobile device, a handheld mobile device, a computer built-in mobile device, or an in-vehicle mobile device. For another example, the wireless terminal may be a part of a mobile station, a part of an access point, or a part of user equipment (UE).

Embodiment 1

Figure 4:
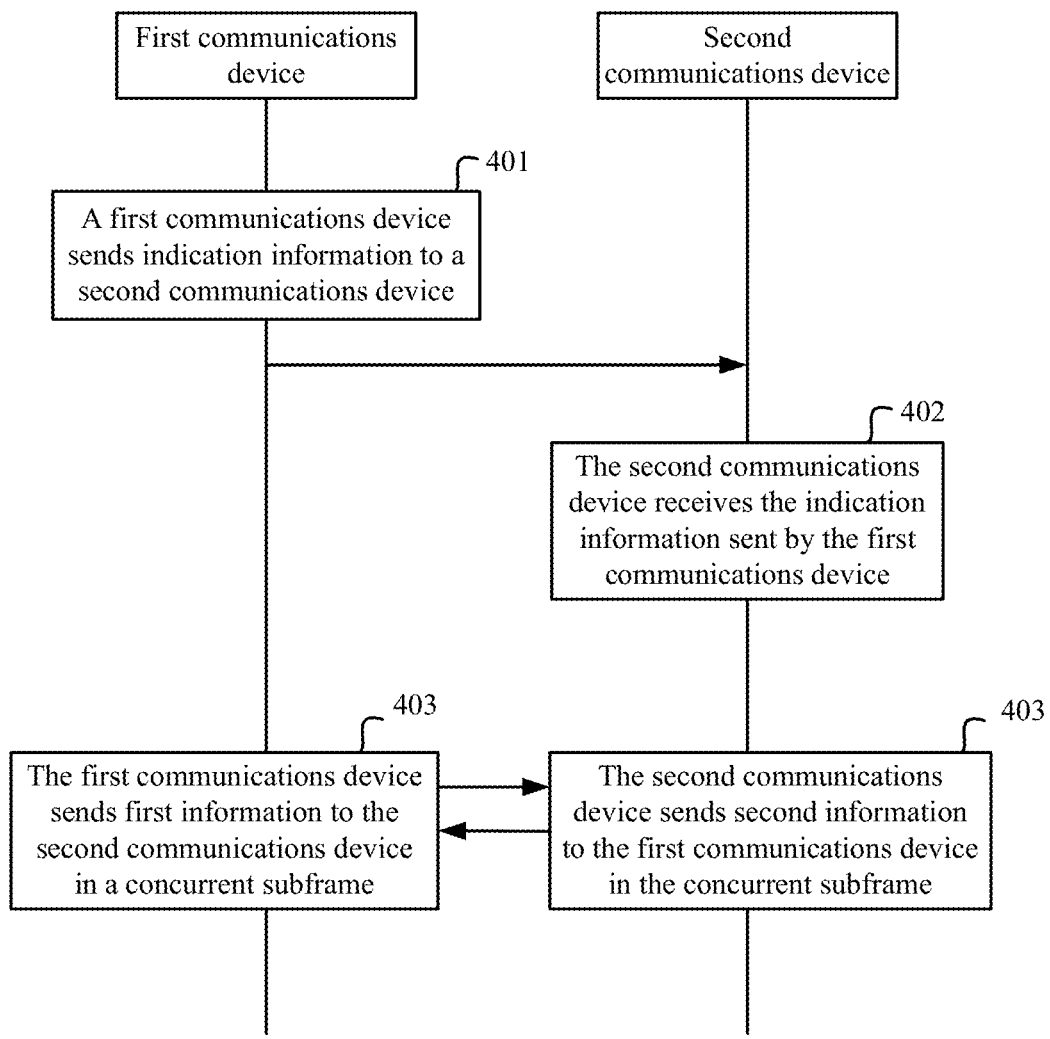
FIG. 4 is a schematic flowchart corresponding to an information transmission method according to Embodiment 1 of the present invention.

Based on the system architectures shown in FIG. 1 and FIG. 2, FIG. 4 is an example of a schematic flowchart corresponding to an information transmission method according to Embodiment 1 of the present invention. As shown in FIG. 4, the method includes the following steps.

Step 401: A first communications device sends indication information to a second communications device based on attribute information of to-be-transmitted target information between the first communications device and the second communications device, where the indication information is used to indicate a concurrent subframe in which the first communications device and the second communications device perform information transmission.

Step 402: The second communications device receives the indication information sent by the first communications device.

Step 403: The first communications device sends first information to the second communications device on a first time-frequency resource in the concurrent subframe; and the second communications device sends second information to the first communications device on a second time-frequency resource in the concurrent subframe, where the to-be-transmitted target information is the first information or the second information.

It can be learned from the foregoing that according to this embodiment of the present invention, bidirectional (for example, uplink and downlink) information transmission between the first communications device and the second communications device can be implemented in the concurrent subframe, so that information with a relatively high requirement on a latency can be transmitted in a timely manner in the concurrent subframe, with no need to wait for a specific uplink subframe or downlink subframe. Therefore, a latency can be effectively reduced, and spectrum resource utilization can be improved.

In an application scenario of this embodiment of the present invention, the first communications device is the network device 101 shown in FIG. 1, and the second communications device is any one of the first terminal 1021, the second terminal 1022, and the third terminal 1023 shown in FIG. 1. Alternatively, in another application scenario, the first communications device is the network device 201 shown in FIG. 2, and the second communications device is the network device 202 shown in FIG. 2. In other words, the information transmission method in this embodiment of the present invention may be applicable to uplink and downlink information transmission between a network device and a terminal, and may also be applicable to information transmission between different network devices. This is not specifically limited.

For ease of description, the following provides descriptions by using the first application scenario (that is, the first communications device is the network device, and the second communications device is the terminal) as an example.

The to-be-transmitted target information may be the first information sent by the network device to the terminal, or may be the second information sent by the terminal to the network device. Therefore, the following specifically describes the two cases separately.

Case 1: The to-be-transmitted target information is the first information.

Specifically, in step 401, after determining that the attribute information of the first information (namely, the to-be-transmitted target information) that needs to be sent meets a preset condition and a quantity of available resources between the network device and the terminal is greater than a first threshold, the network device may send the indication information to the terminal. The attribute information of the first information may include any one or any combination of a plurality of pieces of information such as a data amount of the first information and a latency requirement of the first information. For example, if the attribute information of the first information includes the data amount of the first information and the latency requirement of the first information, that the attribute information of the first information meets a preset condition may be that the data amount of the first information is greater than or equal to a second threshold and the latency requirement of the first information is less than or equal to a third threshold. Values of the first threshold, the second threshold, and the third threshold may be set based on actual experience by persons skilled in the art. This is not specifically limited.

In other words, if determining that the first information that needs to be sent does not meet the preset condition or the quantity of available resources between the network device and the terminal is less than or equal to the first threshold, the network device may not need to send the indication information to the terminal to indicate the concurrent subframe, that is, does not need to perform bidirectional information transmission in one subframe.

Case 2: The to-be-transmitted target information is the second information.

After determining that the terminal needs to send the second information to the network device, the terminal sends a scheduling request message to the network device, where the scheduling request message includes the attribute information of the second information (namely, the to-be-transmitted target information) that the terminal needs to send. Correspondingly, the network device receives the scheduling request message sent by the terminal, and determines, based on the attribute information of the second information in the scheduling request message, whether the attribute information of the second information meets a preset condition. For details, refer to the foregoing descriptions about whether the attribute information of the first information meets the preset condition. Details are not described herein again. If the attribute information of the second information meets the preset condition, and a quantity of available resources between the network device and the terminal is greater than a first threshold, the network device may send the indication information to the terminal.

In other words, if determining that the second information that the terminal needs to send does not meet the preset condition or a quantity of available resources between the network device and the terminal is less than or equal to a first threshold, the network device may not need to send the indication information to the terminal to indicate the concurrent subframe, that is, does not need to perform bidirectional information transmission in one subframe.

In this application, the to-be-transmitted target information may be control information, including information transmitted on a physical uplink control channel (PUCCH), and the information is specifically channel quality indicator information (CQI), a hybrid automatic repeat request (HARQ) ACK and NACK, or the like. Alternatively, the to-be-transmitted target information may be data information, namely, information transmitted on a physical uplink shared channel (PUSCH). For different to-be-transmitted target information, the indication information may include different content. The following provides detailed descriptions.

(1) If the to-be-transmitted target information is the control information, the indication information may include identification information of the concurrent subframe. The identification information of the concurrent subframe may be a subframe number, or may be other information used to identify the concurrent subframe.

Specifically, the control information is usually transmitted by using a specific resource (namely, a resource pre-agreed on by the network device and the terminal) in a subframe. Therefore, if the to-be-transmitted target information is the control information, the network device needs to send only the identification information of the concurrent subframe to the terminal, and the network device and the terminal may transmit the to-be-transmitted target information on a specific resource in the concurrent subframe. In this way, because a data amount of the identification information of the concurrent subframe is usually relatively small, a relatively small quantity of transmission resources are required for transmitting the indication information between the network device and the terminal. Therefore, transmission load is reduced.

Figure 5A:
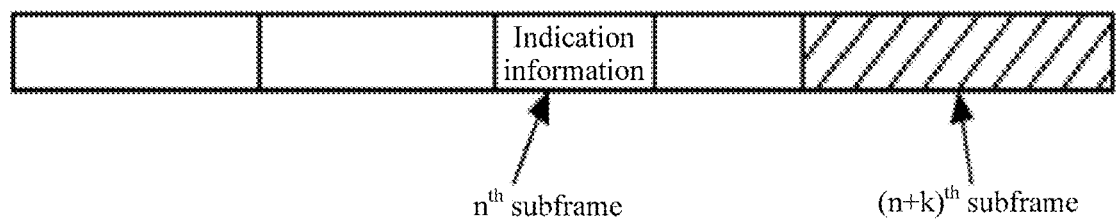
FIG. 5a is a schematic diagram of information transmission according to Embodiment 1 of the present invention.

For example, the to-be-transmitted target information is the first information. As shown in FIG. 5a, after determining that the attribute information of the first information meets the preset condition and the quantity of available resources between the network device and the terminal is greater than the first threshold, the network device sends the indication information to the terminal in an $n^{th}$ subframe, to indicate that an $(n+k)^{th}$ subframe is the concurrent subframe. Subsequently, the network device may send the first information by using a specific resource in the $(n+k)^{th}$ subframe, and correspondingly, the terminal may receive the first information on the specific resource in the $(n+k)^{th}$ subframe. In addition, the terminal may send the second information by using a resource that is in the $(n+k)^{th}$ subframe and that is different from the specific resource, and correspondingly, the network device may receive the second information on the resource that is in the $(n+k)^{th}$ subframe and that is different from the specific resource.

Figure 5B:
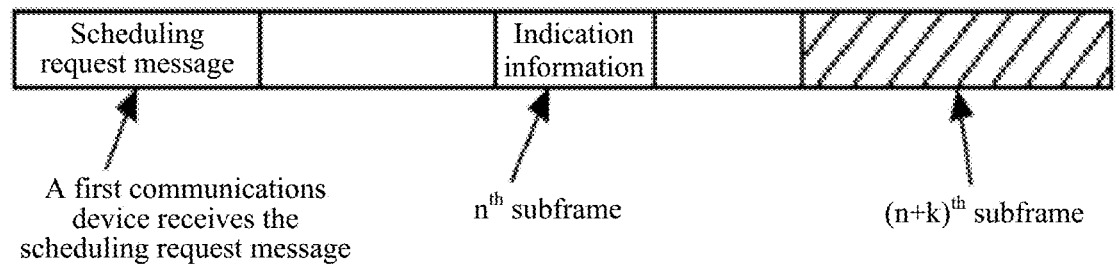
FIG. 5b is a schematic diagram of another type of information transmission according to Embodiment 1 of the present invention.

For another example, the to-be-transmitted target information is the second information. As shown in FIG. 5b, after receiving the scheduling request message sent by the terminal, if determining that the attribute information, of the second information, included in the scheduling request message meets the preset condition and the quantity of available resources between the network device and the terminal is greater than the first threshold, the network device sends the indication information to the terminal in an $n^{th}$ subframe, to indicate that an $(n+k)^{th}$ subframe is the concurrent subframe. Subsequently, the terminal may send the second information by using a specific resource in the $(n+k)^{th}$ subframe, and correspondingly, the network device may receive the second information on the specific resource in the $(n+^{k})^{th}$ subframe. In addition, the network device may send the first information by using a resource that is in the $(n+k)^{th}$ subframe and that is different from the specific resource, and correspondingly, the terminal may receive the first information on the resource that is in the $(n+k)^{th}$ subframe and that is different from the specific resource.

It should be noted that k may be an integer greater than 0. For example, k may be any integer that is greater than or equal to 1 and less than or equal to 10. In order to better shorten information waiting duration and reduce a latency, a value of k should not be excessively large. The value of k may be specifically set based on an actual situation.

(2) If the to-be-transmitted target information is the data information, the indication information may include identification information of an RB in the first time-frequency resource and identification information of an RB in the second time-frequency resource. The identification information of the RB may be a number of the RB, or may be other information used to uniquely identify the RB.

Further, to avoid interference between information transmission on the RB in the first time-frequency resource and information transmission on the RB in the second time-frequency resource, in this embodiment of the present invention, the concurrent subframe may further include a blank RB. The blank RB is a guard resource between the RB in the first time-frequency resource and the RB in the second time-frequency resource, that is, no information is transmitted on the blank RB. Specifically, a quantity of blank RBs may be determined by the network device based on a capability of the network device and a capability of the terminal. For example, for the capability of the network device, a corresponding quantity of RBs that need to be reserved is 8; for the capability of the terminal, a corresponding quantity of RBs that need to be reserved is 12. In this case, the network device may determine the larger quantity of RBs that need to be reserved, as the quantity of blank RBs, that is, the quantity of blank RBs is 12. In this way, interference is more effectively avoided. The network device may obtain the capability of the terminal when establishing a service connection to the terminal.

Figure 6A:
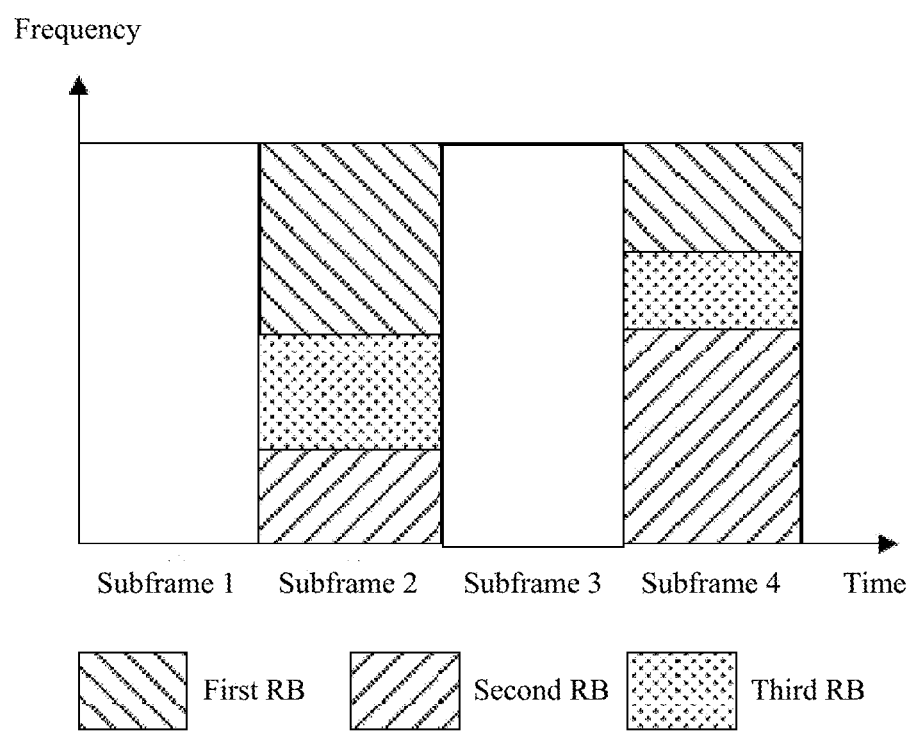
FIG. 6a is a schematic diagram of distribution of first RBs, second RBs, and third RBs.

In this embodiment of the present invention, a quantity of RBs in the first time-frequency resource (hereinafter referred to as first RBs) and a quantity of RBs in the second time-frequency resource (hereinafter referred to as second RBs) may be determined based on an amount of data that needs to be transmitted. FIG. 6a is a schematic diagram of distribution of the first RBs, the second RBs, and the blank RBs (also referred as third RBs). The quantity of the first RBs may be greater than the quantity of the second RBs, as shown in a subframe 2 in FIG. 6a. Alternatively, the quantity of the first RBs may be less than the quantity of the second RBs, as shown in a subframe 4 in FIG. 6a.

It can be learned from the foregoing that in this embodiment of the present invention, the first RBs and the second RBs may be flexibly allocated based on the amount of data that needs to be transmitted. In other words, the first time-frequency resource and the second time-frequency resource in the concurrent subframe are not invariable, and may be dynamically allocated based on an actual situation (for example, the amount of data that needs to be transmitted). In addition, the blank RBs may also be flexibly allocated based on an actual situation (for example, the capability of the network device and the capability of the terminal). Therefore, while interference is effectively avoided, spectrum resources can be properly utilized, and utilization can be improved.

Based on the foregoing content, the first RBs, the second RBs, and the blank RBs in the concurrent subframe in this embodiment of the present invention can be flexibly scheduled, so that such a transmission mode is significantly different from a transmission mode in an existing frequency division multiplexing system (frequency resources used for uplink and downlink information transmission in the frequency division multiplexing system are fixedly allocated resources). In addition, a guard resource with a fixed width is set between the frequency resources used for uplink and downlink information transmission in the existing frequency division multiplexing system, and a value of the fixed width is usually relatively large. Therefore, a manner in this embodiment of the present invention, that is, determining the guard resource based on the capability of the network device and the capability of the terminal, can more effectively improve spectrum resource utilization.

For example, the to-be-transmitted target information is the first information. As shown in FIG. 5a, after determining that the attribute information of the first information meets the preset condition and the quantity of available resources between the network device and the terminal is greater than the first threshold, the network device sends the indication information to the terminal in an $n^{th}$ subframe, to indicate identification information of a first RB in an $(n+k)^{th}$ subframe and identification information of a second RB in the $(n+k)^{th}$ subframe. Subsequently, the network device may send the first information by using the first RB in the $(n+k)^{th}$ subframe, and correspondingly, the terminal may receive the first information on the first RB in the $(n+k)^{th}$ subframe. Moreover, the terminal may send the second information by using the second RB in the $(n+k)^{th}$ subframe, and correspondingly, the network device may receive the second information on the second RB in the $(n+k)^{th}$ subframe.

For another example, the to-be-transmitted target information is the second information. As shown in FIG. 5b, after receiving the scheduling request message sent by the terminal, if determining that the attribute information, of the second information, included in the scheduling request message meets the preset condition and the quantity of available resources between the network device and the terminal is greater than the first threshold, the network device sends the indication information to the terminal in an $n^{th}$ subframe, to indicate identification information of a first RB in an $(n+k)^{th}$ subframe and identification information of a second RB in the $(n+k)^{th}$ subframe. Subsequently, the terminal may send the second information by using the first RB in the $(n+k)^{th}$ subframe, and correspondingly, the network device may receive the second information on the first RB in the $(n+k)^{th}$ subframe. Moreover, the network device may send the first information by using the second RB in the $(n+k)^{th}$ subframe, and correspondingly, the terminal may receive the first information on the second RB in the $(n+k)^{th}$ subframe.

(3) If the to-be-transmitted target information is the data information, the indication information may include identification information of a symbol in the first time-frequency resource (hereinafter referred to as a first symbol) and identification information of a symbol in the second time-frequency resource (hereinafter referred to as a second symbol). The identification information of the symbol may be a number of the symbol, or may be other information used to uniquely identify the symbol.

Figures 6B, 7:
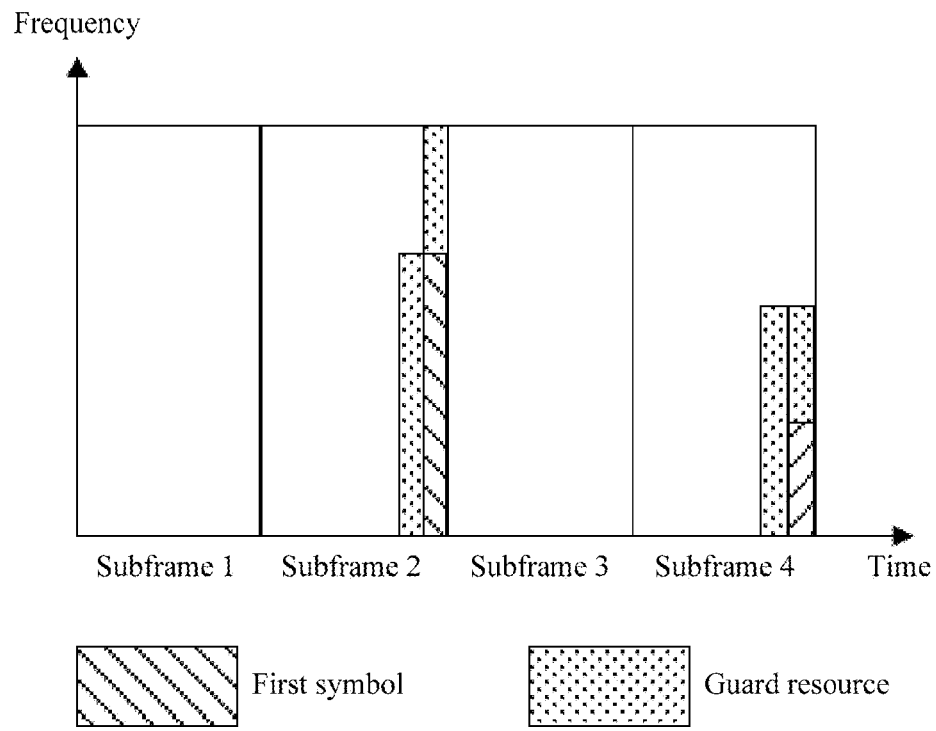
FIG. 6b is a schematic diagram of subcarrier occupation of a first symbol.
FIG. 7 is a schematic diagram of information transmission between a network device and two terminals.

In this application, a quantity of subcarriers occupied by the first symbol may be determined based on an amount of data that needs to be transmitted. FIG. 6b is a schematic diagram of subcarrier occupation of the first symbol. The first symbol may occupy a majority of subcarriers in a subframe, as shown in a subframe 2 in FIG. 6b. Alternatively, the first symbol may occupy a minority of subcarriers in a subframe, as shown in a subframe 4 in FIG. 6b.

The foregoing (2) and (3) limit the first time-frequency resource and the second time-frequency resource from perspectives of frequency domain and time domain, respectively. In this embodiment of the present invention, if the to-be-transmitted target information is the data information, the indication information may alternatively include identification information of a symbol in the first time-frequency resource and identification information of a symbol in the second time-frequency resource, and identification information of an RB in the first time-frequency resource and identification information of an RB in the second time-frequency resource.

It should be noted that if a resource used for control information transmission is not a resource pre-agreed on by the network device and the terminal, when the to-be-transmitted target information is the control information, for content included in the indication information, reference may be made to the content included in the indication information when the to-be-transmitted target information is the data information. Similarly, if a resource used for data information transmission is a resource pre-agreed on by the network device and the terminal, when the to-be-transmitted target information is the data information, for content included in the indication information, reference may be made to the content included in the indication information when the to-be-transmitted target information is the control information.

In this embodiment of the present invention, the foregoing process is described by using information transmission between only two communications devices as an example. In the scenario in which the first communications device is the network device and the second communications device is the terminal, the network device may alternatively perform information transmission with at least two terminals in the concurrent subframe.

FIG. 7 is a schematic diagram of information transmission between a network device and two terminals. As shown in FIG. 7, after determining that the network device needs to send downlink information to a terminal b, the network device sends indication information to a terminal a in an $n^{th}$ subframe, to instruct the terminal a to send uplink data to the network device in an $(n+k)^{th}$ subframe; and sends the indication information to the terminal b, to instruct the terminal b to receive, in the $(n+k)^{th}$ subframe, downlink data sent by the network device. In this way, the terminal a sends the uplink data on some of resources in the $(n+k)^{th}$ subframe, and the terminal b receives the downlink data on some of the resources in the $(n+k)^{th}$ subframe. There is a guard resource between a resource for sending the uplink data and a resource for sending the downlink data, thereby avoiding interference.

Embodiment 2

Figure 8:
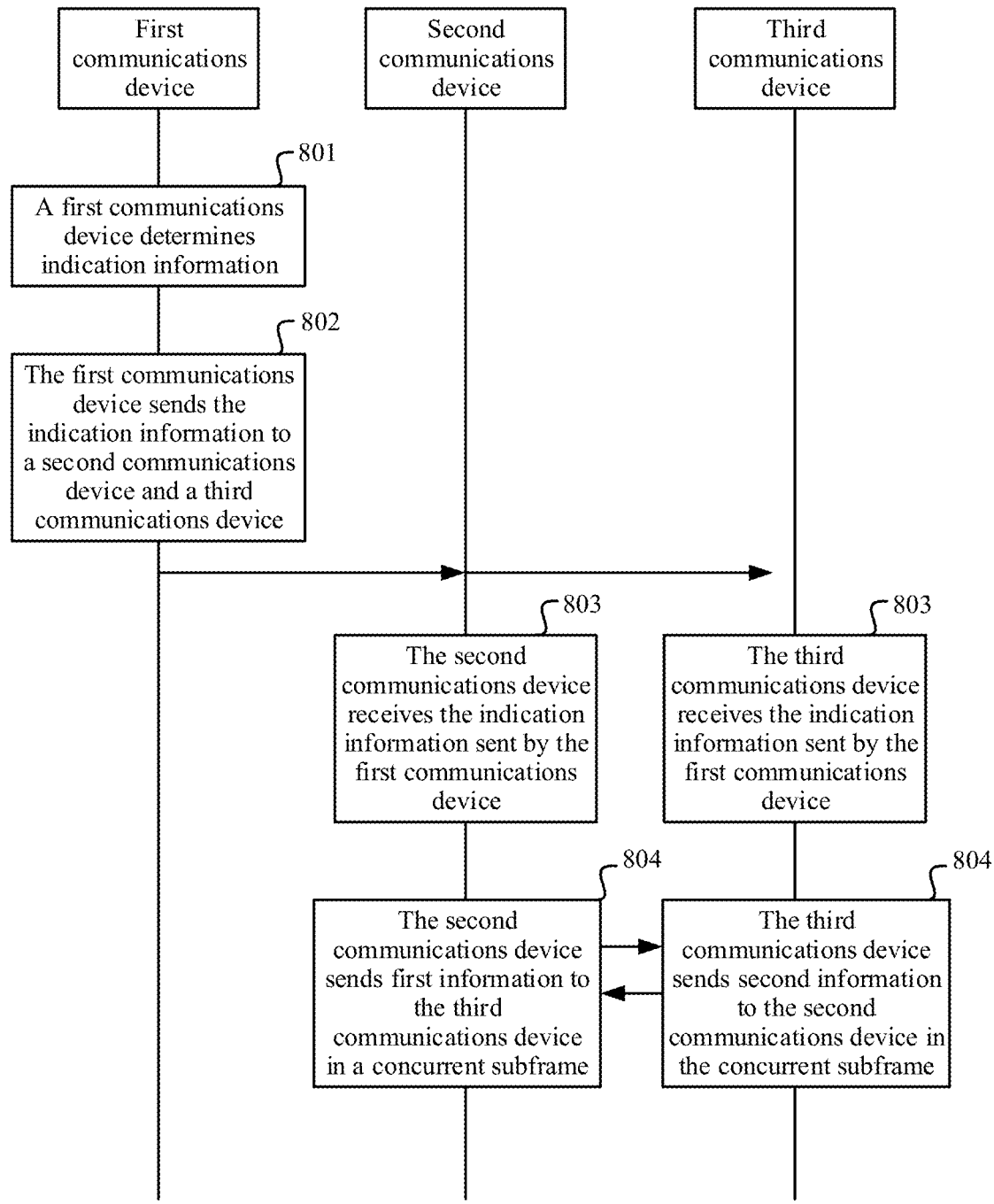
FIG. 8 is an example of a schematic flowchart corresponding to an information transmission method according to Embodiment 2 of the present invention.

Based on the system architecture shown in FIG. 3, FIG. 8 is an example of a schematic flowchart corresponding to an information transmission method according to Embodiment 2 of the present invention. As shown in FIG. 8, the method includes the following steps.

Step 801: A first communications device determines indication information based on attribute information of to-be-transmitted target information between a second communications device and a third communications device.

Step 802: The first communications device sends the indication information to the second communications device and the third communications device, where the indication information is used to indicate a concurrent subframe in which the second communications device and the third communications device perform information transmission.

Step 803: The second communications device receives the indication information sent by the first communications device; and the third communications device receives the indication information sent by the first communications device.

Step 804: The second communications device sends first information to the third communications device on a first time-frequency resource in the concurrent subframe, and receives, on a second time-frequency resource in the concurrent subframe, second information sent by the third communications device, where the to-be-transmitted target information is the first information or the second information.

In an application scenario of this embodiment of the present invention, the first communications device is the network device 301 shown in FIG. 3, the second communications device is the first terminal 3021 shown in FIG. 3, and the third communications device is the second terminal 3022 shown in FIG. 3.

In the foregoing scenario, the to-be-transmitted target information may be the first information sent by the first terminal to the second terminal, or may be the second information sent by the second terminal to the first terminal.

For example, the to-be-transmitted target information may be the first information sent by the first terminal to the second terminal. In this case, in step 801, the first terminal sends a scheduling request message to the network device after determining that the first terminal needs to send the first information to the second terminal, where the scheduling request message includes the attribute information of the first information (namely, the to-be-transmitted target information) that the first terminal needs to send; and correspondingly, the network device receives the scheduling request message sent by the first terminal, and determines, based on the attribute information of the first information in the scheduling request message, whether the attribute information of the first information meets a preset condition. For details, refer to the descriptions in Embodiment 1. Details are not described herein again. If the attribute information of the first information meets the preset condition and a quantity of available resources between the first terminal and the second terminal is greater than a first threshold, the network device may send the indication information to the first terminal and the second terminal.

In other words, if determining that the first information that the first terminal needs to send to the second terminal does not meet the preset condition, or a quantity of available resources between the first terminal and the second terminal is less than or equal to a first threshold, the network device may not need to send the indication information to the first terminal and the second terminal to indicate the concurrent subframe, that is, the first terminal and the second terminal do not need to perform bidirectional information transmission in one subframe.

In this application, if the to-be-transmitted target information is control information, the indication information includes identification information of the concurrent subframe.

If the to-be-transmitted target information is data information, the indication information includes identification information of a first RB in the concurrent subframe and identification information of a second RB in the concurrent subframe. The first RB is used for transmitting the to-be-transmitted target information between the first terminal and the second terminal, and the second RB is used for transmitting, between the first terminal and the second terminal, information other than the to-be-transmitted target information. Alternatively, if the to-be-transmitted target information is data information, the indication information includes identification information of a symbol in the first time-frequency resource and identification information of a symbol in the second time-frequency resource, and/or the indication information includes identification information of an RB in the first time-frequency resource and identification information of an RB in the second time-frequency resource. For specific content, refer to the descriptions in the foregoing Embodiment 1. Details are not described herein again.

Figure 9:
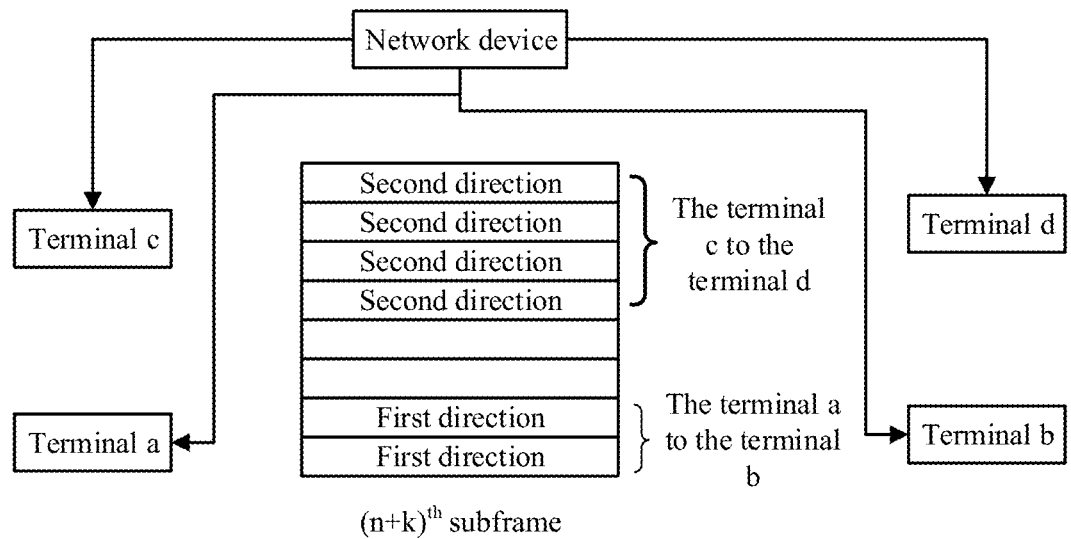
FIG. 9 is a schematic diagram of controlling, by a network device, four terminals to perform information transmission in a concurrent subframe.

It should be noted that the foregoing process is described by using an example in which the network device controls an information transmission process between only two terminals. In this embodiment of the present invention, the network device may alternatively control a plurality of terminals to perform information transmission in the concurrent subframe. FIG. 9 is a schematic diagram of controlling, by a network device, four terminals to perform information transmission in a concurrent subframe. As shown in FIG. 9, a terminal a determines that the terminal a needs to send information to a terminal b, and a terminal c determines that the terminal c needs to send information to a terminal d. In this case, the terminal a and the terminal c send a scheduling request message to the network device in an $n^{th}$ subframe. After receiving the scheduling request message, the network device sends indication information to the terminal a and the terminal b, to instruct the terminal a and the terminal b to perform information transmission in a first direction in an $(n+k)^{th}$ subframe; and sends the indication information to the terminal c and the terminal d, to instruct the terminal c and the terminal d to perform information transmission in a second direction in the $(n+k)^{th}$ subframe. In addition, there is a guard resource between a resource occupied by information transmission in the first direction and a resource occupied by information transmission in the second direction, thereby avoiding interference.

Figure 10:
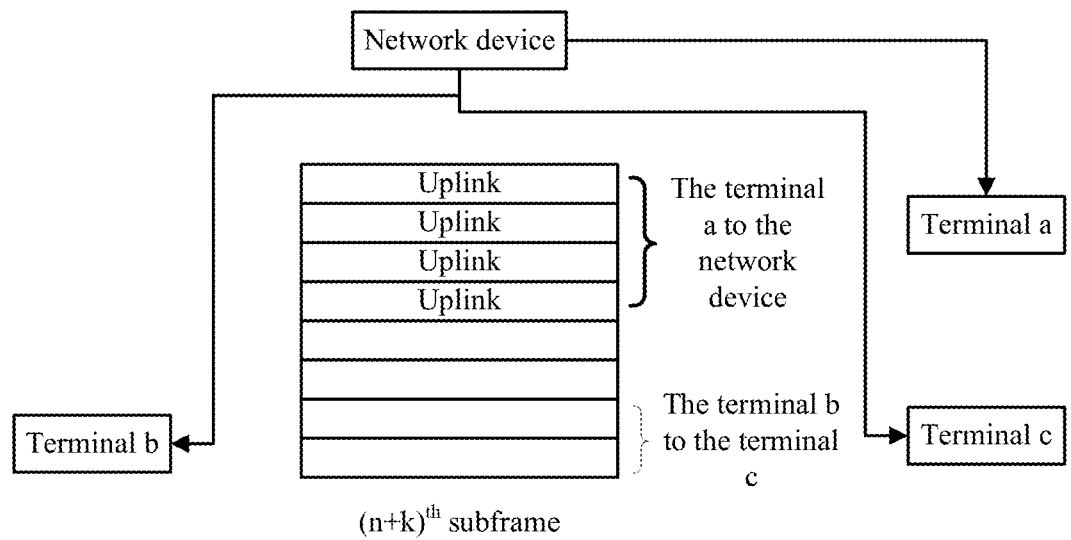
FIG. 10 is a schematic diagram of information transmission in a comprehensive scenario according to an embodiment of the present invention.

With reference to the foregoing Embodiment 1 and Embodiment 2, an embodiment of the present invention further provides a comprehensive scenario. In the scenario, a network device and a terminal a perform information transmission in a concurrent subframe, and the network device controls a terminal b and a terminal c to perform information transmission in the concurrent subframe. FIG. 10 is a schematic diagram of information transmission in the comprehensive scenario according to this embodiment of the present invention. As shown in FIG. 10, after the terminal a determines that the terminal a needs to send uplink information to the network device, and the terminal b determines that the terminal b needs to send information to the terminal c, the terminal a and the terminal b send a scheduling request message to the network device in an $n^{th}$ subframe. After receiving the scheduling request message, the network device sends indication information to the terminal a, to instruct the terminal a to send the uplink information to the network device in an $(n+k)^{th}$ subframe; and sends the indication information to the terminal b and the terminal c, to instruct the terminal b and the terminal c to perform information transmission in the $(n+k)^{th}$ subframe. In addition, there is a guard resource between a resource occupied when the terminal a sends the uplink information to the network device and a resource occupied when the terminal b and the terminal c perform information transmission, thereby avoiding interference.

For the foregoing method process, an embodiment of the present invention further provides a communications device. For specific content about the communications device, refer to the foregoing method embodiments.

Figure 11:
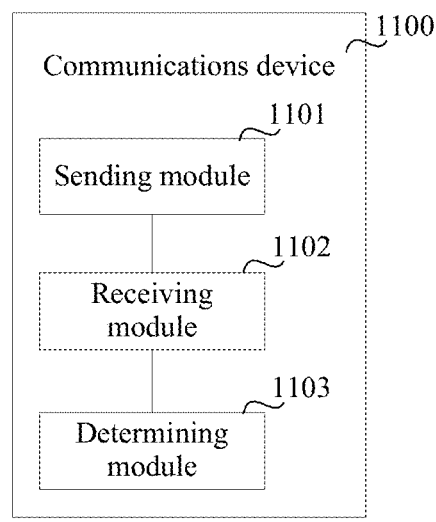
FIG. 11 is a schematic structural diagram of a communications device according to an embodiment of the present invention.

FIG. 11 is a schematic structural diagram of a communications device according to an embodiment of the present invention. The communications device 1100 includes a sending module 1101, a receiving module 1102, and a determining module 1103.

The sending module 1101 is configured to send indication information to a second communications device based on attribute information of to-be-transmitted target information between the communications device and the second communications device, where the indication information is used to indicate a concurrent subframe in which the communications device and the second communications device perform information transmission.

The sending module 1101 is further configured to send first information to the second communications device on a first time-frequency resource in the concurrent subframe.

The receiving module 1102 is configured to receive, on a second time-frequency resource in the concurrent subframe, second information sent by the second communications device, where the to-be-transmitted target information is the first information or the second information.

Optionally, the determining module 1103 is configured to determine, before the sending module 1101 sends the indication information to the second communications device, that the attribute information of the first information meets a preset condition and a quantity of available resources between the communications device and the second communications device is greater than a first threshold; or the receiving module 1102 is further configured to receive a scheduling request message sent by the second communications device, where the scheduling request message includes the attribute information of the second information; and the determining module 1103 determines, before the sending module 1101 sends the indication information to the second communications device, that the attribute information of the second information meets a preset condition and a quantity of available resources between the communications device and the second communications device is greater than the first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

Figure 12:
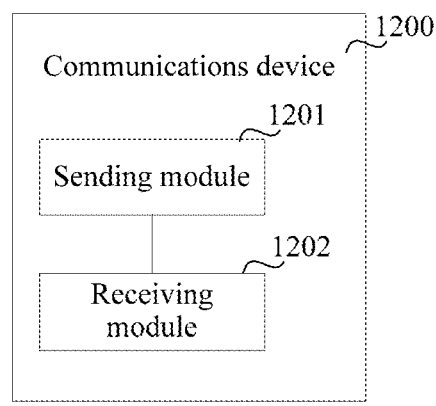
FIG. 12 is a schematic structural diagram of a communications device according to an embodiment of the present invention.

FIG. 12 shows a communications device according to an embodiment of the present invention. The communications device 1200 includes a sending module 1201 and a receiving module 1202.

The receiving module 1202 is configured to receive indication information that is sent by a first communications device based on to-be-transmitted target information between the first communications device and the communications device, where the indication information is used to indicate a concurrent subframe in which the first communications device and the communications device perform information transmission.

The receiving module 1202 is further configured to receive, on a first time-frequency resource in the concurrent subframe, first information sent by the first communications device.

The sending module 1201 is configured to send second information to the first communications device on a second time-frequency resource in the concurrent subframe, where the to-be-transmitted target information is the first information or the second information.

Optionally, before the receiving module 1202 receives the indication information sent by the first communications device, the sending module 1201 is further configured to:

send a scheduling request message to the first communications device, where the scheduling request message includes attribute information of the second information.

Figure 13:
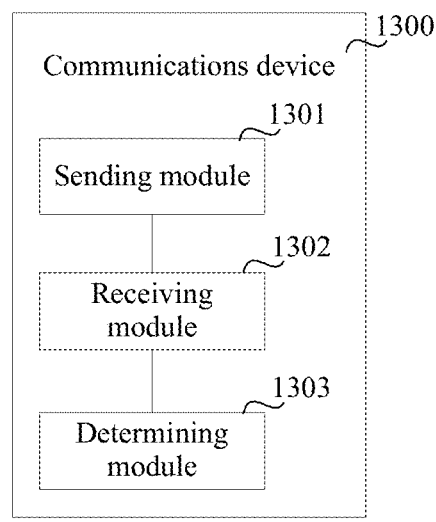
FIG. 13 is a schematic structural diagram of a communications device according to an embodiment of the present invention.

FIG. 13 is a schematic structural diagram of a communications device according to an embodiment of the present invention. The communications device 1300 includes a sending module 1301, a receiving module 1302, and a determining module 1303.

The determining module 1303 is configured to determine indication information based on attribute information of to-be-transmitted target information between a second communications device and a third communications device.

The sending module 1301 is configured to send the indication information to the second communications device and the third communications device, where the indication information is used to indicate a concurrent subframe in which the second communications device and the third communications device perform information transmission.

The concurrent subframe is used for sending, by the second communications device, first information to the third communications device on a first time-frequency resource in the concurrent subframe, and for sending, by the third communications device, second information to the second communications device on a second time-frequency resource in the concurrent subframe; and the to-be-transmitted target information is the first information or the second information.

Optionally, the receiving module 1302 is configured to: before the sending module 1301 sends the indication information to the second communications device and the third communications device, receive a scheduling request message sent by the second communications device, where the scheduling request message includes the attribute information of the to-be-transmitted target information.

The determining module 1303 is specifically configured to determine, before the sending module 1301 sends the indication information to the second communications device and the third communications device, that the attribute information of the to-be-transmitted target information meets a preset condition and a quantity of available resources between the second communications device and the third communications device is greater than a first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

Figure 14:
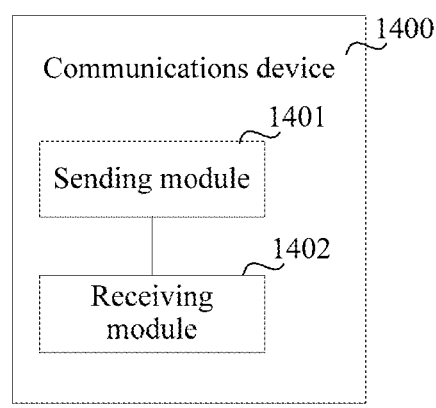
FIG. 14 is a schematic structural diagram of a communications device according to an embodiment of the present invention.

FIG. 14 is a schematic structural diagram of a communications device according to an embodiment of the present invention. The communications device 1400 includes a sending module 1401 and a receiving module 1402.

The receiving module 1402 is configured to receive indication information that is sent by a first communications device based on attribute information of to-be-transmitted target information between the communications device and a third communications device, where the indication information is used to indicate a concurrent subframe in which the communications device and the third communications device perform information transmission.

The sending module 1401 is configured to send first information to the third communications device on a first time-frequency resource in the concurrent subframe.

The receiving module 1402 is further configured to receive, on a second time-frequency resource in the concurrent subframe, second information sent by the third communications device.

Optionally, the sending module 1401 is further configured to:

send a scheduling request message to the first communications device, where the scheduling request message includes the attribute information of the to-be-transmitted target information.

Figure 15:
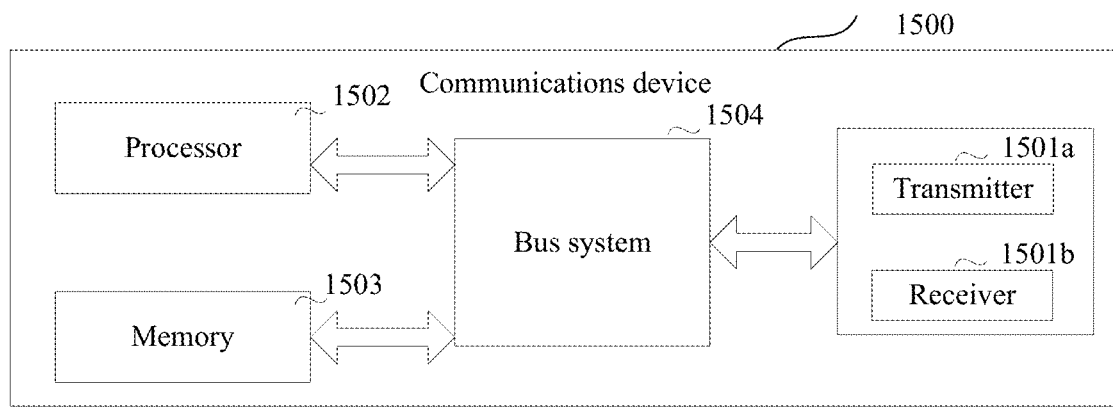
FIG. 15 is a schematic structural diagram of a communications device according to an embodiment of the present invention.

FIG. 15 is a schematic structural diagram of a communications device according to an embodiment of the present invention. The communications device 1500 is configured to perform the method process performed by the foregoing first communications device. As shown in FIG. 15, the communications device 1500 includes a transmitter 1501a, a receiver 1501b, a processor 1502, a memory 1503, and a bus system 1504.

The memory 1503 is configured to store a program. Specifically, the program may include program code, and the program code includes a computer operation instruction. The memory 1503 may be a random access memory (RAM), or may be a non-volatile memory such as at least one magnetic disk storage. Only one memory is shown in the figure. Certainly, alternatively, a plurality of memories may be configured depending on a requirement. The memory 1503 may alternatively be a memory in the processor 1502.

The memory 1503 stores the following elements: executable modules or data structures, or a subset thereof, or an extended set thereof;

operation instructions, including various operation instructions, used to implement various operations; and an operating system, including various system programs, used to implement various basic services and process hardware-based tasks.

The processor 1502 controls operations of the communications device 1500. The processor 1502 may also be referred to as a CPU (central processing unit). During specific application, components of the device 1500 are coupled together by using the bus system 1504. In addition to a data bus, the bus system 1504 may include a power bus, a control bus, a status signal bus, and the like. However, for clear description, various buses in the figure are all denoted as the bus system 1504. For ease of illustration, the bus system 1504 is merely schematically drawn in FIG. 15.

The methods disclosed in the embodiments of this application may be applied to the processor 1502, or be implemented by using the processor 1502. The processor 1502 may be an integrated circuit chip and has a signal processing capability. In an implementation process, the steps in the foregoing methods may be implemented by using a hardware integrated logic circuit in the processor 1502, or by using instructions in a form of software. The processor 1502 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1502 may implement or perform the methods, steps, and logical block diagrams that are disclosed in the embodiments of this application. The general purpose processor may be a microprocessor, or the processor may be any conventional processor or the like. The steps of the methods disclosed with reference to the embodiments of this application may be directly implemented by using a hardware decoding processor, or may be implemented by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1503, and the processor 1502 reads information in the memory 1503 and performs the following method step in combination with hardware of the processor 1502:

sending, by using the transmitter 1501a, indication information to a second communications device based on attribute information of to-be-transmitted target information between the communications device and the second communications device, where the indication information is used to indicate a concurrent subframe in which the communications device and the second communications device perform information transmission.

The transmitter 1501a is further configured to send first information to the second communications device on a first time-frequency resource in the concurrent subframe.

The receiver 1501b is configured to receive, on a second time-frequency resource in the concurrent subframe, second information sent by the second communications device, where the to-be-transmitted target information is the first information or the second information.

Optionally, the processor 1502 is configured to determine, before the transmitter 1501a sends the indication information to the second communications device, that the attribute information of the first information meets a preset condition and a quantity of available resources between the communications device and the second communications device is greater than a first threshold.

The receiver 1501b is further configured to receive a scheduling request message sent by the second communications device, where the scheduling request message includes the attribute information of the second information; and the processor 1502 determines, before the transmitter 1501a sends the indication information to the second communications device, that the attribute information of the second information meets a preset condition and a quantity of available resources between the communications device and the second communications device is greater than the first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

Figure 16:
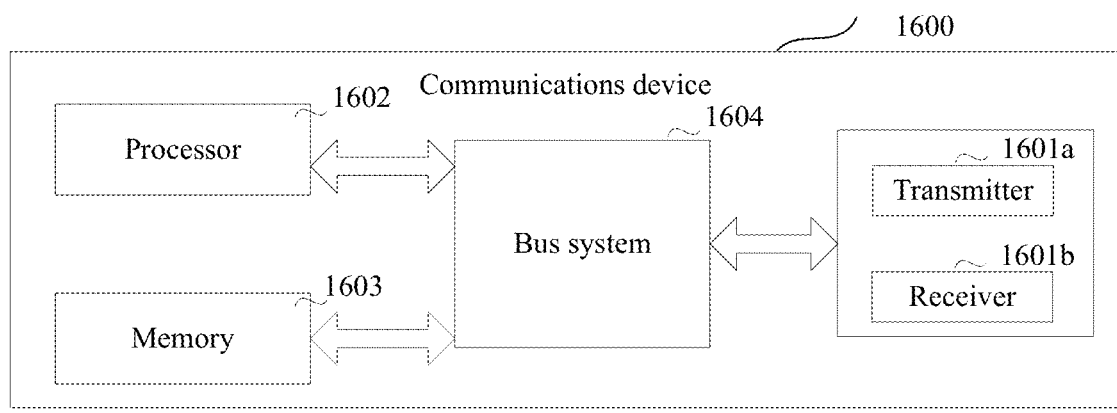
FIG. 16 is a schematic structural diagram of a communications device according to an embodiment of the present invention.

FIG. 16 is a schematic structural diagram of a communications device according to an embodiment of the present invention. The communications device is configured to perform the method process performed by the foregoing second communications device. As shown in FIG. 16, the communications device 1600 includes a transmitter 1601a, a receiver 1601b, a processor 1602, a memory 1603, and a bus system 1604.

The memory 1603 is configured to store a program. Specifically, the program may include program code, and the program code includes a computer operation instruction. The memory 1603 may be a random access memory (RAM), or may be a non-volatile memory such as at least one magnetic disk storage. Only one memory is shown in the figure. Certainly, alternatively, a plurality of memories may be configured depending on a requirement. The memory 1603 may alternatively be a memory in the processor 1602.

The memory 1603 stores the following elements: executable modules or data structures, or a subset thereof, or an extended set thereof;

operation instructions, including various operation instructions, used to implement various operations; and an operating system, including various system programs, used to implement various basic services and process hardware-based tasks.

The processor 1602 controls operations of the communications device 1600. The processor 1602 may also be referred to as a CPU (central processing unit). During specific application, components of the communications device 1600 are coupled together by using the bus system 1604. In addition to a data bus, the bus system 1604 may include a power bus, a control bus, a status signal bus, and the like. However, for clear description, various buses in the figure are all denoted as the bus system 1604. For ease of illustration, the bus system 1604 is merely schematically drawn in FIG. 16.

The methods disclosed in the embodiments of this application may be applied to the processor 1602, or be implemented by using the processor 1602. The processor 1602 may be an integrated circuit chip and has a signal processing capability. In an implementation process, the steps in the foregoing methods may be implemented by using a hardware integrated logic circuit in the processor 1602, or by using instructions in a form of software. The processor 1602 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1602 may implement or perform the methods, steps, and logical block diagrams that are disclosed in the embodiments of this application. The general purpose processor may be a microprocessor, or the processor may be any conventional processor or the like. The steps of the methods disclosed with reference to the embodiments of this application may be directly implemented by using a hardware decoding processor, or may be implemented by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1603, and the processor 1602 reads information in the memory 1603 and performs the following method step in combination with hardware of the processor 1602:

receiving, by using the receiver 1601b, indication information that is sent by a first communications device based on to-be-transmitted target information between the first communications device and the communications device, where the indication information is used to indicate a concurrent subframe in which the first communications device and the communications device perform information transmission.

The receiver 1601b is further configured to receive, on a first time-frequency resource in the concurrent subframe, first information sent by the first communications device.

The transmitter 1601a is configured to send second information to the first communications device on a second time-frequency resource in the concurrent subframe, where the to-be-transmitted target information is the first information or the second information.

Optionally, before the receiver 1601b receives the indication information sent by the first communications device, the transmitter 1601a is further configured to:

send a scheduling request message to the first communications device, where the scheduling request message includes attribute information of the second information.

Figure 17:
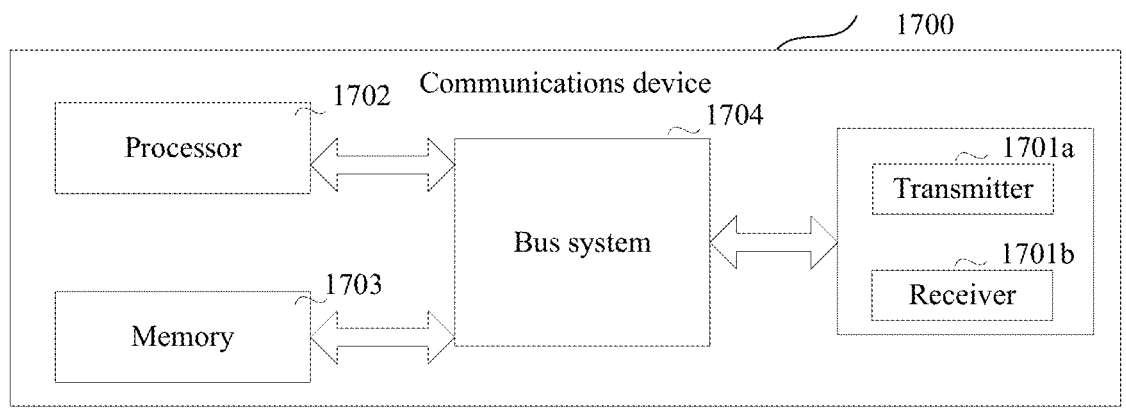
FIG. 17 is a schematic structural diagram of a communications device according to an embodiment of the present invention.

FIG. 17 is a schematic structural diagram of a communications device according to an embodiment of the present invention. The device is configured to perform the method process performed by the foregoing first communications device. As shown in FIG. 17, the communications device 1700 includes a transmitter 1701a, a receiver 1701b, a processor 1702, a memory 1703, and a bus system 1704.

The memory 1703 is configured to store a program. Specifically, the program may include program code, and the program code includes a computer operation instruction. The memory 1703 may be a random access memory (RAM), or may be a non-volatile memory such as at least one magnetic disk storage. Only one memory is shown in the figure. Certainly, alternatively, a plurality of memories may be configured depending on a requirement. The memory 1703 may alternatively be a memory in the processor 1702.

The memory 1703 stores the following elements: executable modules or data structures, or a subset thereof, or an extended set thereof;

operation instructions, including various operation instructions, used to implement various operations; and an operating system, including various system programs, used to implement various basic services and process hardware-based tasks.

The processor 1702 controls operations of the communications device 1700. The processor 1702 may also be referred to as a CPU (central processing unit). During specific application, components of the communications device 1700 are coupled together by using the bus system 1704. In addition to a data bus, the bus system 1704 may include a power bus, a control bus, a status signal bus, and the like. However, for clear description, various buses in the figure are all denoted as the bus system 1704. For ease of illustration, the bus system 1704 is merely schematically drawn in FIG. 17.

The methods disclosed in the embodiments of this application may be applied to the processor 1702, or be implemented by using the processor 1702. The processor 1702 may be an integrated circuit chip and has a signal processing capability. In an implementation process, the steps in the foregoing methods may be implemented by using a hardware integrated logic circuit in the processor 1702, or by using instructions in a form of software. The processor 1702 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1702 may implement or perform the methods, steps, and logical block diagrams that are disclosed in the embodiments of this application. The general purpose processor may be a microprocessor, or the processor may be any conventional processor or the like. The steps of the methods disclosed with reference to the embodiments of this application may be directly implemented by using a hardware decoding processor, or may be implemented by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1703, and the processor 1702 reads information in the memory 1703 and performs the following method step in combination with hardware of the processor 1702:

determining indication information based on attribute information of to-be-transmitted target information between a second communications device and a third communications device.

The transmitter 1701a is configured to send the indication information to the second communications device and the third communications device, where the indication information is used to indicate a concurrent subframe in which the second communications device and the third communications device perform information transmission.

The concurrent subframe is used for sending, by the second communications device, first information to the third communications device on a first time-frequency resource in the concurrent subframe, and for sending, by the third communications device, second information to the second communications device on a second time-frequency resource in the concurrent subframe; and the to-be-transmitted target information is the first information or the second information.

Optionally, the receiver 1701b is configured to: before the transmitter 1701a sends the indication information to the second communications device and the third communications device, receive a scheduling request message sent by the second communications device, where the scheduling request message includes the attribute information of the to-be-transmitted target information.

The processor 1702 is specifically configured to determine, before the transmitter 1701a sends the indication information to the second communications device and the third communications device, that the attribute information of the to-be-transmitted target information meets a preset condition and a quantity of available resources between the second communications device and the third communications device is greater than a first threshold.

Optionally, if the to-be-transmitted target information is control information, the indication information includes identification information of the concurrent subframe.

Optionally, if the to-be-transmitted target information is data information, the indication information includes identification information of a symbol in the first time-frequency resource and identification information of a symbol in the second time-frequency resource; and/or the indication information includes identification information of an RB in the first time-frequency resource and identification information of an RB in the second time-frequency resource.

Optionally, the concurrent subframe further includes a blank RB, and the blank RB is a guard resource between the RB in the first time-frequency resource and the RB in the second time-frequency resource.

Figure 18:
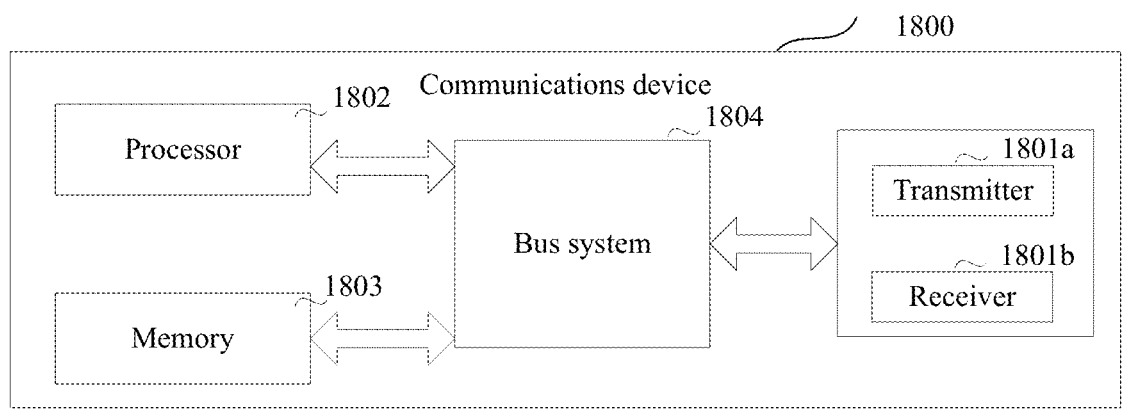
FIG. 18 is a schematic structural diagram of a communications device according to an embodiment of the present invention.

FIG. 18 is a schematic structural diagram of a communications device according to an embodiment of the present invention. The communications device is configured to perform the method process performed by the foregoing second communications device. As shown in FIG. 18, the communications device 1800 includes a transmitter 1801a, a receiver 1801b, a processor 1802, a memory 1803, and a bus system 1804.

The memory 1803 is configured to store a program. Specifically, the program may include program code, and the program code includes a computer operation instruction.

The memory 1803 may be a random access memory (RAM), or may be a non-volatile memory such as at least one magnetic disk storage. Only one memory is shown in the figure. Certainly, alternatively, a plurality of memories may be configured depending on a requirement. The memory 1803 may alternatively be a memory in the processor 1802.

The memory 1803 stores the following elements: executable modules or data structures, or a subset thereof, or an extended set thereof;

operation instructions, including various operation instructions, used to implement various operations; and an operating system, including various system programs, used to implement various basic services and process hardware-based tasks.

The processor 1802 controls operations of the device 1800. The processor 1802 may also be referred to as a CPU (central processing unit). During specific application, components of the device 1800 are coupled together by using the bus system 1804. In addition to a data bus, the bus system 1804 may include a power bus, a control bus, a status signal bus, and the like. However, for clear description, various buses in the figure are all denoted as the bus system 1804. For ease of illustration, the bus system 1804 is merely schematically drawn in FIG. 18.

The methods disclosed in the embodiments of this application may be applied to the processor 1802, or be implemented by using the processor 1802. The processor 1802 may be an integrated circuit chip and has a signal processing capability. In an implementation process, the steps in the foregoing methods may be implemented by using a hardware integrated logic circuit in the processor 1802, or by using instructions in a form of software. The processor 1802 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1802 may implement or perform the methods, steps, and logical block diagrams that are disclosed in the embodiments of this application. The general purpose processor may be a microprocessor, or the processor may be any conventional processor or the like. The steps of the methods disclosed with reference to the embodiments of this application may be directly implemented by using a hardware decoding processor, or may be implemented by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1803, and the processor 1802 reads information in the memory 1803 and performs the following method step in combination with hardware of the processor 1802:

receiving, by using the receiver 1801b, indication information that is sent by a first communications device based on attribute information of to-be-transmitted target information between the communications device and a third communications device, where the indication information is used to indicate a concurrent subframe in which the communications device and the third communications device perform information transmission.

The transmitter 1801a is configured to send first information to the third communications device on a first time-frequency resource in the concurrent subframe.

The receiver 1801b is further configured to receive, on a second time-frequency resource in the concurrent subframe, second information sent by the third communications device.

Optionally, the transmitter 1801a is further configured to:

send a scheduling request message to the first communications device, where the scheduling request message includes the attribute information of the to-be-transmitted target information.

It can be learned from the foregoing content that in the foregoing embodiments of the present invention, the first communications device sends the indication information to the second communications device based on the attribute information of the to-be-transmitted target information between the first communications device and the second communications device, where the indication information is used to indicate the concurrent subframe in which the first communications device and the second communications device perform information transmission; and the first communications device sends the first information to the second communications device in the concurrent subframe, and receives, in the concurrent subframe, the second information sent by the second communications device, where the to-be-transmitted target information is the first information or the second information. It can be learned from the foregoing that according to the embodiments of the present invention, uplink and downlink information transmission between different communications devices can be implemented in a concurrent subframe, so that information with a relatively high requirement on a latency can be transmitted in a timely manner in the concurrent subframe, with no need to wait for a specific uplink subframe or downlink subframe. Therefore, a latency can be effectively reduced, and spectrum resource utilization can be improved.

Persons skilled in the art should understand that the embodiments of the present invention may be provided as a method or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or block in the flowcharts and/or block diagrams and a combination of a process and/or block in the flowcharts and/or block diagrams. These computer program instructions may be provided for a general purpose computer, a special-purpose computer, an embedded processor, or a processor of another programmable data processing device to generate a machine, so that the instructions executed by the computer or the processor of another programmable data processing device generate an apparatus for implementing a specified function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operation steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although embodiments of the present invention have been described, persons skilled in the art can make changes and modifications to these embodiments once they learn of a basic inventive concept. Therefore, the appended claims are intended to be construed as covering the embodiments and all changes and modifications falling within the scope of the present invention.

Obviously, persons skilled in the art may make various modifications and variations to the present invention without departing from the scope of the present invention. Therefore, the present invention is intended to cover these modifications and variations of the present invention provided that these modifications and variations fall within the scope of the claims of the present invention and equivalent technologies thereof.

What is claimed is:

1. An information transmission method, wherein the method is applied to a time division duplexing (TDD) system, and wherein the method comprises:

sending, by a first communications device, indication information to a second communications device based on attribute information of to-be-transmitted target information between the first communications device and the second communications device, wherein the indication information is used to indicate a concurrent subframe in which the first communications device and the second communications device perform information transmission;

sending, by the first communications device, first information to the second communications device on a first time-frequency resource in the concurrent subframe; and receiving, on a second time-frequency resource in the concurrent subframe, second information sent by the second communications device, wherein the to-be-transmitted target information is the first information or the second information.

2. The method according to claim 1, wherein the sending, by a first communications device, indication information to a second communications device based on attribute information of to-be-transmitted target information between the first communications device and the second communications device comprises:

sending, by the first communications device, the indication information to the second communications device in response to determining that the attribute information of the first information meets a preset condition and that a quantity of available resources between the first communications device and the second communications device is greater than a first threshold.

3. The method according to claim 1, wherein the sending, by a first communications device, indication information to a second communications device based on attribute information of to-be-transmitted target information between the first communications device and the second communications device comprises:

receiving, by the first communications device, a scheduling request message sent by the second communications device, wherein the scheduling request message comprises the attribute information of the second information; and sending, by the first communications device, the indication information to the second communications device in response to determining that the attribute information of the second information meets a preset condition and that a quantity of available resources between the first communications device and the second communications device is greater than a first threshold.

4. The method according to claim 1, wherein the to-be-transmitted target information is control information, and wherein the indication information comprises identification information of the concurrent subframe.

5. The method according to claim 1, wherein the to-be-transmitted target information is data information, and wherein the indication information comprises identification information of a symbol in the first time-frequency resource and identification information of a symbol in the second time-frequency resource.

6. The method according to claim 1, wherein the to-be-transmitted target information is data information, and wherein the indication information comprises identification information of a resource block (RB) in the first time-frequency resource and identification information of an RB in the second time-frequency resource.

7. The method according to claim 5, wherein the concurrent subframe further comprises a blank RB, and wherein the blank RB is a guard resource between the RB in the first time-frequency resource and the RB in the second time-frequency resource.

8. The method according to claim 6, wherein the concurrent subframe further comprises a blank RB, and wherein the blank RB is a guard resource between the RB in the first time-frequency resource and the RB in the second time-frequency resource.

9. A communications device, wherein the communications device comprises:

at least one processor; and a non-transitory computer-readable storage medium coupled to the at least one processor and storing programming instructions for execution by the at least one processor, the programming instructions instructing the at least one processor to:

send indication information to a second communications device based on attribute information of to-be-transmitted target information between the communications device and the second communications device, wherein the indication information is used to indicate a concurrent subframe in which the communications device and the second communications device perform information transmission;

send first information to the second communications device on a first time-frequency resource in the concurrent subframe; and receive, on a second time-frequency resource in the concurrent subframe, second information sent by the second communications device, wherein the to-be-transmitted target information is the first information or the second information.

10. The communications device according to claim 9, wherein the programming instructions instruct the at least one processor to:

determine that the attribute information of the first information meets a preset condition and that a quantity of available resources between the communications device and the second communications device is greater than a first threshold; and send the indication information to the second communications device.

11. The communications device according to claim 9, wherein the programming instructions instruct the at least one processor to:

receive a scheduling request message sent by the second communications device, wherein the scheduling request message comprises the attribute information of the second information;

determine that the attribute information of the second information meets a preset condition and that a quantity of available resources between the communications device and the second communications device is greater than a first threshold; and send the indication information to the second communications device.

12. The communications device according to claim 9, wherein the to-be-transmitted target information is control information, and wherein the indication information comprises identification information of the concurrent subframe.

13. The communications device according to claim 9, wherein the to-be-transmitted target information is data information, and wherein the indication information comprises identification information of a symbol in the first time-frequency resource and identification information of a symbol in the second time-frequency resource.

14. The communications device according to claim 9, wherein the to-be-transmitted target information is data information, and wherein the indication information comprises identification information of an RB in the first time-frequency resource and identification information of an RB in the second time-frequency resource.

15. The communications device according to claim 13, wherein the concurrent subframe further comprises a blank RB, and wherein the blank RB is a guard resource between the RB in the first time-frequency resource and the RB in the second time-frequency resource.

16. The communications device according to claim 14, wherein the concurrent subframe further comprises a blank RB, and wherein the blank RB is a guard resource between the RB in the first time-frequency resource and the RB in the second time-frequency resource.

17. A non-transitory computer readable medium comprising computer program codes stored thereon, executable by one or more digital processors for information processing, wherein the computer program codes comprise instructions, and wherein the instructions, when executed by the one or more digital processors, instruct the one or more digital processors to:

send indication information to a second communications device based on attribute information of to-be-transmitted target information between a first communications device and the second communications device, wherein the indication information is used to indicate a concurrent subframe in which the first communications device and the second communications device perform information transmission;

send first information to the second communications device on a first time-frequency resource in the concurrent subframe; and receive, on a second time-frequency resource in the concurrent subframe, second information sent by the second communications device, wherein the to-be-transmitted target information is the first information or the second information.

18. The non-transitory computer readable medium according to claim 17, wherein the to-be-transmitted target information is control information, and wherein the indication information comprises identification information of the concurrent subframe.

19. The non-transitory computer readable medium according to claim 17, wherein the to-be-transmitted target information is data information, and wherein the indication information comprises identification information of a symbol in the first time-frequency resource and identification information of a symbol in the second time-frequency resource.

20. The non-transitory computer readable medium according to claim 17, wherein the to-be-transmitted target information is data information, and wherein the indication information comprises identification information of an RB in the first time-frequency resource and identification information of an RB in the second time-frequency resource.

* * * * *